United States Patent [19]

Nair et al.

[11] Patent Number: 5,192,727
[45] Date of Patent: Mar. 9, 1993

[54] PROCESS FOR MODIFYING THE PORE SYSTEM OF ZEOLITE LZ-202

[75] Inventors: Vinayan Nair, East White Plains; Donald F. Best, Mahopac; Lawrence D. Vail, Tappan, all of N.Y.

[73] Assignee: UOP, Des Plaines, Ill.

[21] Appl. No.: 747,050

[22] Filed: Aug. 19, 1991

[51] Int. Cl.$^5$ .............................................. B01J 29/06
[52] U.S. Cl. ........................................ 502/64; 502/86; 423/704; 423/705
[58] Field of Search ............................. 502/64, 85, 86; 423/328

[56] References Cited

U.S. PATENT DOCUMENTS

| | | | |
|---|---|---|---|
| 4,241,036 | 12/1980 | Flanigen et al. | 423/328 |
| 4,477,582 | 10/1984 | Miale | 502/77 |
| 4,724,067 | 2/1988 | Raatz et al. | 208/120 |
| 4,780,436 | 10/1988 | Raatz et al. | 502/66 |
| 4,840,779 | 6/1989 | Cannan | 423/328 |
| 4,871,702 | 10/1989 | Chang et al. | 502/86 |
| 5,095,169 | 3/1992 | Skeels et al. | 585/739 |

FOREIGN PATENT DOCUMENTS 0957946 9/1982 U.S.S.R. .............................. 502/86

*Primary Examiner*—Anthony McFarlane
*Attorney, Agent, or Firm*—Thomas K. McBride; Richard G. Miller

[57] ABSTRACT

Zeolite LZ-202 and other zeolites synthesized in the absence of organic templating agents and having a crystal structure isotypic with the mineral mazzite are subjected to a three-step treatment to greatly increase their surface area, catalytic activity and adsorptive capacity for adsorbates having molecular dimensions as large as the $SF_6$ molecule. The treatment steps involve an initial conventional $NH_4^+$ ion-exchange, steaming at temperatures in excess of 300° C. and a low-pH $NH_4^+$ ion-exchange at pH values below 4.0.

6 Claims, No Drawings

PROCESS FOR MODIFYING THE PORE SYSTEM OF ZEOLITE LZ-202

FIELD OF THE INVENTION

The present invention relates in general to a method for producing a modified form of zeolite LZ-202 and, more particularly, for producing a form of zeolite LZ-202 having an exceptionally high surface area, adsorption capacity for large molecules and improved catalytic activity. The starting zeolite LZ-202 is ammonium ion exchanged, steamed at a temperature of at least 500° C and then again subjected to an ammonium ion exchange using an exchange medium having a pH of less than 4.0, preferably in the range of about 0.5 to less than 4.0. The invention also relates to the use of the modified zeolite compositions in catalytic hydrocarbon conversion reactions.

BACKGROUND OF THE INVENTION

Zeolite LZ-202 is a synthetic aluminosilicate molecular sieve topologically related to the mineral zeolite mazzite and to other synthetic zeolites of the mazzite type including zeolite Omega, or ZSM-4, as it is sometimes referred to. The synthesis techniques and characterization of LZ-202 are reported in detail in U.S. Pat. No. 4,840,779, issued Jun. 20, 1989, to T. R. Cannan, the entire disclosure of which is incorporated by reference herein Zeolite LZ-202 and mazzite, unlike zeolite Omega or ZSM-4, are crystallized hydrothermally from a reaction mixture free of organic templating agents. In a preferred method for synthesis of LZ-202, the procedure comprises (a) combining, with sufficient agitation to maintain a slurry, (i) an aqueous solution of an aluminum salt containing the anion of a strong mineral acid such as $SO_4^{-2}$ and (ii) an aqueous solution of an alkali metal hydroxide in sufficient amount to neutralize the aluminum salt of solution (i); (b) blending with the slurry of step (a) an alkali metal silicate in an amount such that the silica is from about 5 to about 30 times the moles of alumina and the alkali metal is from about 1 to about 12 times the molar concentration of alumina; (c) adjusting the water content of the reaction mixture, if necessary, to contain from about 30 to 100 moles of water per mole of alkali metal (as the oxide), and (d) digesting and crystallizing the mixture at a temperature of about 90° C. to 150° C. until crystals of LZ-202 are obtained. In terms of mole ratios of oxides, the reaction mixture formed from $Na_2O$, $Al_2O_3$, $SiO_2$, $H_2O$ and $SO_4^{-2}$ ions contains the following proportions:

| | A<br>Composition<br>Ratios | B<br>Preferred<br>Ratios | C<br>Particularly<br>Preferred<br>Ratios |
|---|---|---|---|
| $SiO_2/Al_2O_3$ | 5–30 | 6–10 | 8.0–8.2 |
| $Na_2O/SiO_2$ | 0.03–1 | 0.2–0.5 | 0.30–0.34 |
| $H_2O/Na_2O$ | 3.0 ± 0.2 | 3.0 ± 0.2 | 3.0 ± 0.2 |
| $SO_4/Al_2O_3$ | 3.0 ± 0.2 | 3.0 ± 0.2 | 3.0 ± 0.2 |

The as-synthesized LZ-202 typically has a chemical composition (anhydrous basis) in terms of molar oxide ratios of:

$$1.0 \pm 0.5\ Na_2O : Al_2O_3 : 5-20\ SiO_2$$

and has an x-ray powder diffraction pattern containing as the principal d-spacings the lines set forth in tabular form below. The relative intensities are designated as VS (very strong), S (strong), MS (medium strong) and M (medium).

| d (A) | Relative Intensity |
|---|---|
| 15.54 | M |
| 9.06 | VS |
| 7.83 | M |
| 6.81 | MS |
| 5.93 | M |
| 4.68 | M |
| 3.79 | MS |
| 3.70 | M |
| 3.61 | M |
| 3.51 | S |
| 3.15 | S |
| 3.08 | M |
| 3.02 | M |
| 2.91 | S |

Except for the mineral species mazzite, LZ-202 can be differentiated from other omega-type zeolites in two ways, namely, the capability of LZ-202 to be completely ion-exchanged in its as-synthesized form without a prior calcination, and the ability to retain at least 30%, and usually 75%, of its crystallinity after undergoing treatment with an aqueous ammonium fluorosilicate solution to dealuminate its crystal lattice and substitute extraneous silicon atoms for framework aluminum atoms in accordance with the procedure described in U.S. Pat. No. 4,503,023, incorporated herein by reference. As used herein and in the appended claims the term "mazzite-type zeolite" refers to zeolites, such as LZ-202, having the mazzite crystal structure and crystallized from reaction mixtures essentially free of amine or quaternary ammonium templating agents. Unless otherwise specified, the mazzite-type zeolite is in its as-found or as-synthesized form.

In our commonly assigned copending Application Ser. No. 628,830, filed Dec. 17, 1990, there is disclosed a process for modifying forms of zeolite Omega synthesized from reaction systems containing organic templating agents. The process involves (a) an initial calcination in air to destroy the organic moieties, (b) ammonium ion-exchange to lower the alkali metal content of the air-calcined product, (c) calcination in steam and (d) ion-exchange using an aqueous ammonium ion solution adjusted to a pH of less than 4.0. The modification procedure improves the usefulness of the zeolite Omega product as a catalyst or catalyst base. In particular, the process is directed toward improving the thermal stability of activated forms of zeolite Omega, the instability believed to be related to the initial presence and subsequent removal of the organic cations. For that reason it was expected that neither mazzite nor LZ-202 would benefit from the proposed treatment since neither contain organic cations in the as-synthesized form.

Since the mineral mazzite and the as-synthesized form of LZ-202 contain essentially 100 equivalent percent alkali metal cations in charge-balancing association with $AlO_2^-$ tetrahedral units, it is necessary to very substantially reduce the alkali metal cation content in order to use the zeolite as catalyst constituents in most of the common hydrocarbon conversion reactions. It has been surprisingly found, however, that ion-exchange of the as-synthesized LZ-202, while effectively removing the undesirable alkali metal cations, can have a marked effect upon the adsorptive properties of the zeolite which appear to be somewhat dependent upon the pH of the ion-exchange medium, but is in general unpredictable Regardless of the pH of the ammonium ion-exchange medium employed, the nitrogen surface area of the exchanged product is not more than about 100 m²/g. indicating an unacceptably low degree of access to the internally-contained catalytically active sites of the zeolite structure for molecular species of even very small kinetic diameters. More significant is the adsorptive capacity of the ammonium-exchanged product for $SF_6$ which has a kinetic diameter of $5.5 \times 10^{-4}$ micrometers. The higher the $SF_6$ adsorption capacity the larger the percentage of the crystal internal surface available to hydrocarbon or other organic species involved in commercial hydrocarbon conversion reactions. As illustrated by the experimental data set forth hereinafter, the initial ammonium exchange procedure can cause a modest increase in the $SF_6$ capacity of the product, leave it substantially unchanged or reduce it, even to a value of essentially zero.

SUMMARY OF THE INVENTION

In accordance with the present invention there is provided a process for treating a mazzite-type zeolite, e.g., an as-synthesized LZ-202, to produce a zeolite composition having a chemical composition in terms of molar oxide ratios in the anhydrous state of $$xM_{2/n}O : Al_2O_3 : ySiO_2$$

wherein "M" represents a cation having the valence "n," "x" has a value of from zero to about 1.2, "y" has a value of at least 7, preferably greater than 10, an x-ray diffraction pattern containing at least the following d-spacings,

| d, (A) | Relative Intensity |
|---|---|
| 15.54 ± 0.2 | M |
| 9.06 ± 0,2 | VS |
| 7.9 ± 0.2 | M |
| 6.9 ± 0.2 | MS |
| 5.95 ± 0.1 | M |
| 4.69 ± 0.1 | M |
| 3.79 ± 0.1 | MS |
| 3.70 ± 0.1 | M |
| 3.62 ± 0.05 | MS |
| 3.51 ± 0.05 | MS |
| 3.14 ± 0.05 | S |
| 3.08 ± 0.05 | M |
| 3.03 ± 0.05 | M |
| 2.92 ± 0.05 | S | an adsorption capacity for $SF_6$ of at least 6.0 weight percent when measured at 22° C. and an $SF_6$ pressure of 400 mm. Hg, an adsorption capacity for oxygen of at least 20 weight percent when measured at −183° C. and an oxygen pressure of 100 mm. Hg, and a surface area (B.E.T.) of at least 300 m²/gram.

In preparing the modified compositions, the procedure comprises the steps of (a) providing a maxxite-type zeolite starting material containing alkali metal cations;

(b) contacting the composition of step (a) with an aqueous solution of non-metallic cations under cation exchange conditions to lower the alkali metal cation content to below 0.1 equivalent percent;

(c) calcining the ion-exchanged product of step (b) in contact with at least 3 psia steam at a temperature of from about 300° C. to 800° C., preferably from 500° C. to 650° C., preferably for a period of at least about 2 hours; and thereafter (d) contacting the steamed product of step (c) with a sufficient amount of an aqueous solution of ammonium ions having a pH of less than about 4.0 and for a sufficient time to increase the bulk $Si/Al_2$ ratio of the zeolite composition with respect to the starting composition of step (a) and to a value of at least 7.0.

DETAILED DESCRIPTION OF THE INVENTION

The starting zeolite used to prepare the novel compositions of the present invention can be a mazzite-type zeolite, i.e., the mineral mazzite or any zeolite LZ-202 prepared in accordance with the teachings of U.S. Pat. No. 4,840,779, issued to T. R. Cannan, or similar synthesis procedures in which the zeolite product having the crystal structure of zeolite Omega is crystallized in a form essentially free of organic templating material. Of the mazzite-type starting compositions, those in which the framework $Si/Al_2$ molar ratio is within the range of 5-12 are preferably employed.

In the initial step of the preparative process the starting zeolite is ion-exchanged with non-metallic cations to reduce the alkali metal content of the zeolite to less than about 0.1 equivalent percent. The term non-metallic cations is intended to mean hydrogen or ammonium cations or precursors of hydrogen or ammonium cations. It is highly preferred that the cations substituted for the alkali metal cations consist of, or at least comprise, ammonium cations. In general, the non-metallic nitrogen-containing cations which are precursors of hydrogen or ammonium cations, such as the tetraalkylammonium and other quaternary ammonium compounds, are relatively large ionic species which have difficulty in rapidly diffusing through the pore system of the zeolite to contact the alkali metal cations. In addition, these organic species are in general quite expensive and their use needlessly increases the costs of the process. Hydrogen cations introduced by ion-exchange with an inorganic or organic acid medium are entirely suitable for the practice of the preparative procedure, but it is sometimes difficult to obtain the necessary direct replacement of alkali metal cations with hydrogen without damage to the zeolite crystal structure. Accordingly, the ion exchange is carried out in any manner conventional in the art, preferably with an aqueous solution of an ammonium salt such as $NH_4Cl$, $NH_4NO_3$ or $(NH_4)_2SO_4$ at a temperature of from about 25° C. to 100° C., preferably about 90° C. Advantageously multiple-step procedures are used in which the zeolite is contacted with a series of fresh ion-exchange solutions which prevent the creation of an equilibrium condition from developing as exchanged alkali metal ions from the zeolite become more concentrated in the exchange solution. After the alkali metal cation content of the zeolite has been reduced to below about 0.1 weight percent, the zeolite is washed with water to remove any occluded salt.

The low-alkali metal zeolite is then steamed at a temperature of from 300° C. to 800° C., preferably from 550° C.–750° C., for a period of about 0.5 to 2 hours, depending somewhat upon the temperature, with at least 3.0 psia steam, preferably 100% steam. The steaming procedure appears to remove aluminum atoms from the crystal lattice, but the mechanism has not been fully elucidated. The available literature on the subject indicates that the dealumination of zeolite LZ-202 does not closely parallel the much more thoroughly investigated dealumination mechanism of zeolite Y using steam. Moreover, the experimental data presented hereinafter provide added evidence that the dealuminations of zeolite LZ-202 and zeolite Y do not occur in the same or similar manner. Regardless of the mechanism, the steaming should be continued until there is at least some reduction in the unit cell constant, $a_o$, and preferably to not more than about $18.21 \times 10^{-4}$ micrometers.

The steamed zeolite product is then contacted with a low-pH aqueous solution of ammonium ions. The concentration of the ammonium ion solution is not a critical factor, but is generally in the range of 100 to 300 gram ions/liter of $NH_4^+$. The amount of ammonium ion solution relative to the zeolite composition is also not critical, but solutions containing from 100 to 200 gram ions of $NH_4^+$ per 100 grams of zeolite (anhydrous basis) have been found to be suitable. As in the case of the ion-exchange of step (b) of the preparative process, supra, multiple, preferably three, contacts of the zeolite with fresh solutions of ammonium ions are more effective than one-step treatments. The ammonium ions can be provided by any of the common ammonium salts such as $NH_4Cl$ and $NH_4NO_3$, the latter being preferred. It is a critical matter that the pH of the $NH_4^+$ ion solution be not greater than 4.0 and is preferably in the range of 0.5 to less than 4.0. The pH can readily be adjusted to the proper range by the addition of a mineral acid such as nitric or hydrochloric acid. The temperature of contact of the zeolite and the $NH_4^+$ solution is generally in the range of 25° C. to 100° C., preferably about 90° C. Optimum conditions of contact time, temperature and concentration of ammonium ions are readily determined for each mazzite-type starting material by periodic monitoring of the physical and chemical properties of the zeolite.

The process of preparation and the unique properties of the resulting modified mazzite-type zeolite are illustrated by the following examples involving LZ-202. In making the surface area, adsorption capacity, oxygen adsorption capacity and Butane Cracking Activity measurements referred to in the Examples, the following procedures were used:

(a) Surface Area—Determined utilizing the Brunauer-Emmett-Teller (BET) theory of multilayer adsorption. The surface area is determined by measuring the volume of nitrogen gas adsorbed at liquid nitrogen temperatures. The single point analysis is used. Sample preparation is accomplished by heating the sample to 400° C. and evacuating to a pressure of less than 10 micrometers for 16 hours.

The surface area is calculated from the experimental data according to the equation:

Surface area (m²/g) = 4.35 (1/S + I)

wherein S = Slope of $P/V_a(P_o - P)$ vs $P/P_o$ = $P_o/V_a(P_o - P)$

In single point analyses, the value of I is zero since the intercept passes through the origin. $V_a$ represents the volume of nitrogen adsorbed The BET surface area determination is well known in the art.

(b) $SF_6$ Adsorption Capacity—a conventional McBain-Baker adsorption apparatus was employed The test sample was activated at 400° C. overnight under vacuum of $10^{-5}$ torr and then cooled to 22° C. $SF_6$ was introduced into the apparatus in contact with the zeolite sample at a pressure of 400 mm. Hg and at a temperature of 22° C. The weight difference between the starting zeolite and the zeolite in contact with the $SF_6$ after 2 hours was calculated and reported in terms of weight percent, anhydrous basis of the zeolite. The anhydrous weight of zeolite is determined after calcination at 400° C. for 16 hours.

(c) Oxygen Adsorption Capacity—Determined in the same manner as in the case of $SF_6$, supra, except the oxygen pressure was 100 mm Hg and the temperature was −183° C.

(d) Butane Cracking Activity—The procedure described in detail by H. Rastelli et al in the Canadian Journal of Chemical Engineering, 60, pgs. 44–49 (1982), incorporated by reference herein, was employed.

EXAMPLE 1: Preparation of Starting LZ-202

(a) A sample of LZ-202 was synthesized by the following procedure: An aqueous solution of aluminum sulfate was prepared by dissolving 23.3 kilograms of $Al(SO_4)_3 \cdot 18\ H_2O$ in 35.9 kilograms of distilled water. An aqueous solution of sodium hydroxide was prepared by dissolving 8.6 kilograms NaOH pellets (97.7% NaOH) in 17.2 kilograms of distilled water. The aluminum sulfate solution and the sodium hydroxide solutions were then combined by slowly adding the former to the latter and stirring the resulting mixture for about 2 hours to obtain a homogeneous composition, and thereafter was added with stirring 58.7 kilograms of sodium silicate (9.1 wt. % $Na_2O$, 29.2 wt. % $SiO_2$, 61.7 wt. % $H_2O$). Finally were added 3.6 kilograms of seed crystals of zeolite Omega which had been calcined to destroy the organic template material The reaction mixture, exclusive of the seed crystals, had a composition in terms of mole ratios of oxides of:

2.46 $Na_2O$ : 3.0 $Na_2SO_4$ : $Al_2O_3$ : 8.15 $SiO_2$ : 163 $H_2O$

The mixture was digested and crystallized under autogenous pressure at 125° C. for about 16 hours. The solid product was recovered by filtration, washed with 423 liters of hot water, and dried in air at 100° C. By x-ray analysis the product was established to be substantially pure LZ-202 having a B-E-T nitrogen surface area of 109 m²/g, and an adsorptive capacity for $SF_6$ of 3.3 weight percent, and an oxygen adsorption capacity of 14.33 weight percent. The chemical composition of the LZ-202 in terms of molar oxide ratios was:

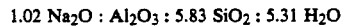
1.02 $Na_2O$ : $Al_2O_3$ : 5.83 $SiO_2$ : 5.31 $H_2O$

The x-ray powder diffraction pattern contained the following d-spacings:

| d, (A) | Relative Intensity |
| --- | --- |
| 15.95 | 16.7 |
| 9.14 | 100 |
| 7.91 | 22.2 |
| 6.88 | 54.2 |
| 5.99 | 29.1 |
| 4.71 | 18.6 |
| 3.81 | 66.7 |
| 3.72 | 31.3 |
| 3.63 | 29.8 |
| 3.53 | 76.3 |
| 3.17 | 74.0 |
| 3.10 | 32.6 |
| 3.04 | 28.2 |

The properties of the treated products are set forth in Table I, below:

TABLE I

| Steaming Temperature, °C. | Treatment*** | Treated Product Properties | | | | |
|---|---|---|---|---|---|---|
| | | X-ray Crystallinity* | Bulk SiO$_2$/Al$_2$O$_3$ | Framework **IR, cm$^{-1}$ | SF$_6$ Capacity (Wt. %) | S.A. m$^2$/g. |
| 500 | — | 45235 | 5.83 | 1040 | 3.3 | 109 |
| " | (i) | 24554 | 7.9 | 1044 | 1.7 | 181 |
| " | (i) (ii) (ii) | 23039 | 8.6 | 1039 | 2.6 | 267 |
| " | (iii), pH = 0.85 | 29629 | 9.6 | 1047 | 3.2 | 276 |
| " | (iii) (iii) pH = 0.85 | 11883 | 16.7 | 1066 | 3.4 | 289 |
| 650 | — | 22864 | — | 1031 | — | — |
| " | (i) | 13321 | 7.59 | 1048 | 0.7 | 110 |
| " | (i) (ii) | 12526 | 7.88 | 1050 | 0.6 | 127 |
| " | (iii), pH = 0.85 | 19093 | 7.5 | 1047 | 0.7 | 77 |
| " | (iii) (iii) pH = 0.85 | 12151 | 7.5 | 1060 | 1.3 | 153 |

*Sum of area under four selected peaks (at 2 theta values of 23.4, 25.3, 28.4 and 30.6)
**Asymmetric
***Where multiple treatments are indicated, the treatments were performed in the order indicated.

| d, (A) | Relative Intensity |
|---|---|
| 2.93 | 79.3 |

(b) A second LZ-202 sample was synthesized by essentially the same procedure as described in part (a) above. The chemical composition of the zeolite in terms of molar oxide ratios was:

1.15 Na$_2$O : Al$_2$O$_3$ : 6.26 SiO$_2$ : 5.8 H$_2$O

The zeolite had an oxygen adsorption capacity of 14.1 weight percent, an SF$_6$ adsorption capacity of 3.20 weight percent and a nitrogen surface area (1 point B-E-T) of 47.2 m$^2$/g.

EXAMPLE 2: Comparison

Two samples of the as-synthesized form of LZ-202 prepared in Ex. 1, part (a) supra, were subjected to steaming at 500° and 650° C., respectively, for a period of about 2 hours using a 100% steam environment. Thereafter portions of the steamed products were each treated one or more times in accordance with one of the following procedures:

(i) Acid Wash: Zeolite sample treated with a nitric acid solution containing 0.5 g. of 70% reagent grade nitric acid and 4.5 g. of distilled water per gram of zeolite (anhydrous basis). The zeolite was slurried in the distilled water and heated to 85° C. At that temperature the nitric acid was slowly added and the system held at temperature for 1 hour after acid addition was complete. The treated zeolite was recovered by filtration, washed with 20 times the zeolite weight of water, and dried at 100° C. in air.

(ii) Standard Ammonium Exchange: Zeolite sample was slurried in 5 grams of distilled water per gram of zeolite. To the slurry was added 1.5 grams of NH$_4$NO$_3$ per gram of zeolite. The system was heated to 93° C. and held for one hour at that temperature. The ammonium exchanged product was recovered by filtration, washed with 20 times zeolite weight of distilled water, and dried in air at 100° C.

(iii) Low pH Ammonium Exchange: The procedure is identical to the Standard Ammonium Exchange procedure of part (ii) except that after the system attained a temperature of 93° C., the pH was adjusted to the desired value by the addition of 70% aqueous reagent grade nitric acid. The adjusted pH value was maintained during the one hour holding period at 93° C.

EXAMPLE 3: Comparison (a) A sample of the LZ-202 composition of Example 1(b) was ammonium ion-exchanged in accordance with the procedure designated as (ii) in Example 2, supra. The procedure was repeated twice for a total of three ion-exchange treatments. The pH of the exchange medium at the start of each treatment was 4.25. The recovered product was denominated as Sample 3(a).

(b) A sample of the LZ-202 composition of Example 1(b) was ammonium ion-exchanged by a procedure identical with that designated as (ii) in Example 2, supra, except that the temperature of the ion-exchange medium was 95° C. instead of 93° C. and the ion-exchanged zeolite was washed with about 15, rather than 20, times zeolite weight of distilled water. This procedure was repeated twice for a total of three ion-exchange treatments. The recovered product was denominated as Sample 3(b).

(c) The bulk Si/Al$_2$ ratio of Samples 3(a) and 3(b) were determined by wet chemical analysis and the adsorption capacity of each sample for SF$_6$ was also determined. The results were Sample 3(a): Si/Al$_2$ =5.94; SF$_6$ Capacity= 0.00 wt. %

Sample 3(b): Si/Al$_2$ =5.9; SF$_6$ Capacity=5.0 wt. %

It is apparent that only slight changes in the initial ammonium ion-exchange of as-synthesized LZ-202 can result in significant differences in the pore blockage insofar as SF$_6$ adsorption is concerned. While the noted differences in ion-exchange temperature and degree of water washing may have been the principal causes of the observed difference in results, the procedures were performed by two different investigators. Subtle differences in technique may also have contributed or been principally responsible for the observed property differences.

EXAMPLE 4

(a) The ammonium ion-exchanged composition identified as Sample 3(a), above, was subjected to steaming at 700° C. for 2 hours using a 100% steam environment. Thereafter the steamed product, which had a nitrogen surface area of 213 m$^2$/g., was twice ion exchanged with ammonium cations using an ion-exchange medium having a pH of 0.85. Each ion-exchange treatment was performed in accordance with the procedure described in Example 2, part (iii). The product LZ-202 was found to have an adsorption capacity for $SF_6$ of 10.1 weight percent, a bulk $Si/Al_2$ ratio of 118 and a surface area of 559 $m^2/g$.

(b) Portions of the ammonium ion-exchanged composition identified as Sample 3(b), above, were subjected to steaming for 2 hours at 400° C., 500° C. and 600° C., respectively, and then further treated one or more times in accordance with the ammonium exchange procedure described in Example 2 under part (iii). The results obtained in parts (a) and (b) are set forth in Table II below. The pH of the ion-exchange medium in each treatment appears in the Table. The starting composition, i.e., Sample 3(b), had a bulk $Si/Al_2$ ratio of 5.92, a surface area of 183 $m^2/g$ and an x-ray crystallinity (see footnote in Table II) of 49462.

ratio (to about 10), and the $SF_6$ adsorption capacity (to about 8 wt. %). The surface area was also increased. A second low-pH (pH = 0.85) ammonium exchange caused a further increase in the $Si/Al_2$ molar ratio to 27. In some cases the second low-pH treatment did not remove non-framework aluminum from the pores. A few of these materials also had increased surface area and good $SF_6$ adsorption capacity. Similar results were obtained with ammonium-exchanged LZ-202 steamed at 700° C.

The importance of unblocking the pore system of LZ-202 for the adsorption of large molecules is readily demonstrated by the correlation of the catalytic isomerization activity of the zeolite with its adsorption capacity for $SF_6$. In general a higher adsorption capacity for $SF_6$ leads to a higher value for $K_8$ which in turn is likely to result in higher yields of 2,2-dimethylbutane. As

TABLE II

| Starting Sample | Treatment | S.A.* | Bulk $Si/Al_2$ | $SF_6$ Cap., Wt. % | X-Ray Crystallinity** | Product Ident. No. |
|---|---|---|---|---|---|---|
| 3 (b) | steamed at 400° C. | — | 5.9 | 1.96 | 41763 | 3 (b) (1) |
| 3 (b) (1) | (iii), pH = 0.85 | 481 | 15.4 | 5.28 | 19553 | 3 (b) (2) |
| 3 (b) (2) | (iii), pH = 0.85 | 304 | 58.4 | 2.64 | 1872 | 3 (b) (3) |
| 3 (b) (1) | (iii), pH = 1.5 | 289 | 7.0 | 6.94 | 34067 | 3 (b) (4) |
| 3 (b) (4) | (III), pH = 1.5 | 308 | 7.8 | 8.68 | 35049 | 3 (b) (5) |
| 3 (b) | steamed at 500° C. | — | — | 1.02 | 38846 | 3 (b) (6) |
| 3 (b) (6) | (iii), pH = 0.85 | 364 | 9.0 | 8.19 | 39953 | 3 (b) (7) |
| 3 (b) (7) | (iii), pH = 0.85 | 418 | 21.7 | 7.67 | 21750 | 3 (b) (8) |
| 3 (b) | steamed at 600° C. | — | — | 1.3 | 30893 | 3 (b) (9) |
| 3 (b) (9) | (iii), pH = 0.85 | 437 | 10.0 | 8.61 | 31884 | 3 (b) (10) |
| 3 (b) (10) | (iii), pH = 0.85 | 487 | 21.3 | 10.4 | 19267 | 3 (b) (11) |

*S.A. = Surface Area, $m^2/g$.
**Sum of area under peaks at 2 theta values of 23.4, 25.3, 28.4 and 30.6)

It is readily apparent from the data of the foregoing Examples that LZ-202 can undergo significant pore blockage for large molecules (as represented by $SF_6$) by simple ammonium ion-exchange and also by subsequent steaming of the ion-exchanged product over the range of 400° C. to 700° C. Triple ammonium exchanges of the as-synthesized LZ-202 at pH values in the range of 2.3 to 13 increased its surface area but did not significantly alter its adsorption capacity. These ammonium exchanges did, however, reduce the sodium cation content to levels of about 100 ppm ($Na_2O$) in most instances. Acid treatment of the as-synthesized LZ-202 increased the bulk $Si/Al_2$ ratios but did not clear the blocked pores for $SF_6$ adsorption. The steaming of ammonium-exchanged forms of LZ-202 at 400° C. did not cause any change in the framework $SiO_2/AlC_2O_3$ ratio. Low pH ammonium exchange (at pH=1.5) of this steamed LZ-202 increased the $Si/Al_2$ molar ratio (to 7.8), surface area (to 300$m^2/g$) and $SF_6$ adsorption capacity (to 8.7 wt. %). Ammonium exchanges at a lower pH (pH=0.85) destroyed the crystallinity suggesting that steaming at 400° C. did not stabilize the LZ-202

Steaming of the LZ-202 at 500° C. and 600° C. removed framework aluminum and caused pore-blockage. A low-pH ammonium exchange (pH = 0.85) of the steamed LZ-202 did not cause any significant changes in crystallinity. It, however, increased the $Si/Al_2$ molar shown by the experimental data set forth in Example 5 below, the formation of 2,2-dimethylbutane by the catalytic conversion of a mixed $C_5$-$C_6$ paraffin feedstock is in direct proportion to the $SF_6$ capacity of the LZ-202 based catalyst.

EXAMPLE 5

Eight catalyst compositions were prepared from various modified forms of the as-synthesized LZ-202 prepared by the synthesis procedures of Example 1(a) and 1(b). In preparing the catalysts, the modified zeolite in powder form was ion-exchanged with approximately 0.34 wt. % platinum as tetramine platinum (II) chloride, formed into ⅛" extrudates containing 10 weight percent nitric acid peptized alumina binder and calcined in air according to the following temperature regime:

(a) raised from room temperature to 100° C. over a period of 5 minutes and held at 100° C. for 8 hours;

(b) raised from 100° C. to 220° C. over a period of 1 hour and held at that temperature for 1 hour;

(c) raised from 220° C. to 365° C. over the period of 1 hour and held at that temperature for 30 minutes;

(d) raised from 365° C. to 540° C. over the period of 1 hour and held at that temperature for 90 minutes; and (e) lowered from 540° C. to room temperature over the period of 90 minutes.

The catalyst pellets were loaded into a fixed bed reactor and contacted at a temperature of about 250° C. with a feedstock consisting of 60 percent n-pentane, 35 percent n-hexane and 5 percent cyclohexane. Selectivity measurements are typically quoted at 96% $C_5+C_6$ yield.

The modified LZ-202 compositions of the eight catalyst compositions tested were prepared as described below. The steaming, acid washing, normal ammonium exchange and low pH exchange procedures were the same as described hereinabove in Example 2.

Sample 5(a): LZ-202 starting material, prepared as in Ex. 1(a) above, was ammonium ion-exchanged three times at normal pH, steamed for 2 hours at 600° C. and ammonium ion-exchanged once at a pH of 0.85. Product bulk $Si/Al_2$ = 7.5; $SF_6$ capacity = 3.9 wt. %.

Sample 5(b): The same starting LZ-202 and modification treatment as for sample 5(a) except that the steamed product was twice ammonium exchanged at a pH of 0.85. Product bulk $Si/Al_2$ = 9.0; $SF_6$ capacity = 5.1 wt. %.

Sample 5(c): The same starting LZ-202 as in Sample 5(a) was initially ammonium exchanged and steamed at 600° C. as in the preparation of Sample 5(a). The steamed product was then washed with aqueous nitric acid without any subsequent ammonium ion-exchange. Product bulk $Si/Al_2$ = 9.5; $SF_6$ capacity = 5.2 wt. %.

Sample 5(d): A portion of the sample 5(c) composition was subjected to a second wash with nitric acid. Product bulk $Si/Al_2$ = 27; $SF_6$ capacity = 6.9 wt. %.

Sample 5(e): LZ-202 starting material prepared as in Example 1(b) was thrice ammonium ion-exchanged at normal pH, steamed for 2 hours at 600° C. and ammonium ion-exchanged at a pH of 0.85. Product bulk $Si/Al_2$ = 10.0; $SF_6$ capacity = 8.6 wt. %.

Sample 5(f): LZ-202 starting material prepared as in Example 1(a) was prepared by the same procedure as used in preparing Sample 5(e) except that the steaming was carried out at 500° C. instead of 600° C.

Sample 5(g): A portion of the Sample 5(a) was treated a second time with an ammonium ion-exchange medium at a pH of 0.85. The product bulk $Si/Al_2$ = 14.6; $SF_6$ capacity = 9.3 wt. %.

Sample 5(h): A portion of Sample 5(e) was treated a second time with an ammonium ion-exchange medium at a pH of 0.85. The product bulk $Si/Al_2$ = 21.3; $SF_6$ = 10.4 wt. %.

A comparison of the chemical and physical properties of the modified LZ-202 compositions, overall catalyst compositions and the performance of the catalysts with respect to yield of 2,2-dimethylbutane are shown in Table III, below:

TABLE III

| Composition | Bulk $Si/Al_2$ | Framework IR, $cm^{-1}$ | Ka* | $SF_6$ Cap., wt % | S.A., $m^2/g$ | % 2,2-DMB Yield |
|---|---|---|---|---|---|---|
| 5 (a) LZ-202 | 7.5 | 1064 | 175 | 3.9 | 430 | — |
| 5 (a) Catalyst | — | 1073 | — | 2.8 | — | 16.4 |
| 5 (b) LZ-202 | 9.0 | 1073 | 120 | 5.1 | 466 | — |
| 5 (b) Catalyst | — | — | — | 3.2 | 424 | 16 |
| 5 (c) LZ-202 | 9.5 | 1069 | 163 | 5.2 | 405 | 16.8 |
| 5 (c) Catalyst | | | | | | |
| 5 (d) LZ-202 | 27.0 | 1080 | — | 6.9 | 410 | — |
| 5 (d) Catalyst | — | 1080 | — | 5.0 | 360 | 17.3 |
| 5 (e) LZ-202 | 10.0 | 1071 | 246 | 8.6 | 437 | |
| 5 (e) Catalyst | — | 1078 | — | 5.2 | 391 | 18.3 |
| 5 (f) LZ-202 | 9.0 | 1058 | 127 | 8.2 | 364 | |
| 5 (f) Catalyst | — | 1069 | — | 6.3 | — | 16 |
| 5 (g) LZ-202 | 14.6 | 1071 | — | 9.3 | 501 | — |
| 5 (g) Catalyst | — | 1071 | — | 7.0 | 499 | 19.6 |

*Butane Cracking

The anomalous results obtained using the catalyst composition formed from Sample 5(f) are believed to be due to a low $K_a$ value because of the relatively low $Si/Al_2$ ratio of the LZ-202 and/or a relatively low degree of dispersion of the platinum constituent on the zeolite.

What is claimed is:

1. Process for treating a zeolite having the mazzite crystal structure and crystallized from a reaction mixture essentially free of amine or quaternary ammonium templating agents to increase its adsorptive capacity for molecular species having kinetic diameters of at least about $5.5 \times 10^{-4}$ micrometers which comprises the steps of:
   (a) providing said zeolite in the alkali metal cation form as the starting material;
   (b) contacting the composition of step (a) with an aqueous solution of non-metallic cations under ion-exchange conditions to lower the alkali metal content to below 0.1 equivalent per cent;
   (c) calcining the ion-exchanged product of step (b) in contact with at least 3 psia steam at a temperature of from about 300° C. to 800° C.; and thereafter;
   (d) contacting the steamed product of step (c) with a sufficient amount of an aqueous solution of ammonium ions having a pH of less than about 4.0 and for a sufficient time to increase the bulk $Si/Al_2$ ratio of the zeolite composition with respect to the starting composition of step (a) and to a value of at least 7.0.

2. Process according to claim 1 wherein the zeolite starting material is an as-synthesized LZ-202.

3. Process according to claim 2 wherein in step (c) the calcination is carried out in an environment of 100 percent steam and for a period of at least about one hour.

4. Process according to claim 3 wherein the steam environment is at a temperature within the range of about 500° to 700° C.

5. Process according to claim 3 wherein in step (d) the contact between the steamed product of step (c) and the aqueous ammonium ion solution is carried out for a sufficient time and with a sufficient amount of ammonium ion solution to increase the adsorptive capacity for $SF_4$ to at least 6.0 weight percent of a temperature of 22° C. and an $SF_4$ pressure of 400 mm Hg.

6. Process according to claim 3 wherein the pH of the aqueous ammonium ion solution employed in step (d) is within the range of 0.5 to 2.0.

* * * * *